United States Patent Office 3,804,798
Patented Apr. 16, 1974

3,804,798
CURE OF ETHYLENE-PROPYLENE-NONCON-
JUGATED DIENE THERPOLYMER ELASTOMER
Stephen E. Cantor, Cheshire, Conn., assignor to Uniroyal,
Inc., New York, N.Y.
No Drawing. Filed Feb. 11, 1972, Ser. No. 225,641
Int. Cl. C08d 9/00
U.S. Cl. 260—42.33                                27 Claims

ABSTRACT OF THE DISCLOSURE

EPDM compositions containing a dioxime (e.g., p-quinone dioxime) and a N-haloamide (e.g., 1,3-dichloro-5-methyl-5-isobutyl hydantoin) are useful as adhesives, sealants or caulks which cure at ambient temperature. When the composition contains silica filler, adhesion is enhanced. Cured sheets of EPDM can be cemented together with the adhesive. A solution of N-haloamide, applied to an EPDM sheet containing a dioxime, causes the sheet to cure.

---

This invention relates to the cure of ethylene-propylene-nonconjugated diene terpolymer elastomer.

It has been shown by Flory and Rehner, in the case of butyl rubber, that certain oxidants are effective in converting quinone dioximes to the corresponding dinitrosobenzenes which then cure the elastomer through the diolefin unit of the polymer chain [Ind. Eng. Chem. 38, 500 (1964)].

U.S. Pat. 2,442,083, Hall et al., May 25, 1948, describes the use of certain N-haloamides as activators for quinone dioxime cures of butyl cements.

W. Hoffman, "Vulcanization and Vulcanizing Agents" (Palmerton Publishing Co., New York, N.Y., 1967), pp. 294–5, states that as a cross-linking agent for unsaturated ethylene/propylene copolymers, p-benzoquinone dioxime requires powerful activation by such metallic oxides as lead oxides and the presence of sulfur has a favorable effect. Hoffmann reports that the literature contains conflicting statements about crosslinking with p-benzoquinone dioxime alone.

E. I. du Pont Development Products Report No. 18, December 1961, "ECD–330," p. 4, indicates that quinoid curing systems such as those used in butyl rubber are not effective in ECD–330, which is an EPDM elastomer.

U.S. Pat. 3,190,859, Wei et al., June 22, 1965, discloses vulcanization of saturated EPM at elevated temperature with quinone-N-haloimides.

U.S. Pat. 3,226,356, Kehr et al., Dec. 28, 1965, discloses cure of EPDM at elevated temperature with quinonedioxime dibenzoate, and a Lewis acid or Lewis acid precursor as an accelerator.

U.S. Pat. 3,478,004, Kehr et al., Nov. 11, 1969, discloses crosslinking of EPDM at elevated temperature with certain non-quinoid diesters of dioximes.

In accordance with the invention, it has now been found that ethylene-propylene-nonconjugated diene type of elastomer (hereinafter referred to as "EPDM") can be cured under ambient conditions with a combination of a dioxime and a N-haloamide. The EPDM compositions of the invention containing a dioxime and N-haloamide are particularly useful in the form of cements or adhesives, or high-solids sealants or caulking compositions, which are self-curing at ordinary ambient temperatures. When the composition contains silica filler, adhesion is greatly enhanced. The adhesive composition of the invention can be used to adhere two elastomer bodies together. One advantageous way of practicing the invention, particularly with the more soluble N-haloamides, involves applying a solution of such N-haloamide to a surface of an uncured EPDM stock containing a dioxime. The N-haloamide diffuses into the stock, producing cure thereof.

The EPDM type of elastomer employed in the curing process of the invention is ordinarily an ethylene-propylene-nonconjugated diene terpolymer rubber and may be described more generally as a copolymer of at least two different alpha-monoolefins with at least one copolymerizable polyene which serves to confer unsaturation on the copolymer. Ordinarily one of the alpha-monoolefins is ethylene, while the other is ordinarily propylene, although other pairs of alpha-monoolefins may also be used. The polyene employed is frequently a diene, and although conjugated dienes can be used, best results are ordinarily obtained with nonconjugated dienes, whether an open-chain diolefin as in 1,4-hexadiene or a cyclic diene as in such bridged ring dienes as dicyclopentadiene and the alkenyl or alkylidene norbornenes (e.g., methylene norbornene, ethylidene norbornene, etc.), as described for example in U.S. Pat. 3,562,228, Matthews et al., Feb. 9, 1971. More than one diene (e.g., dicyclopentadiene plus 5-ethylidene-2-norbornene) can be used. More than one EPDM may be used in the composition of the invention, if desired.

In practicing the invention, the EPDM is compounded with a dioxime and a N-haloamide and the mixture is subjected to ambient conditions to bring about cure. For this purpose any dioxime may be employed, whether quinoid or non-quinoid, including for example dioximes of one of the following Formulas I or II:

(I) 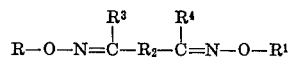

wherein R and $R^1$ are the same or different and are selected from the group consisting of such bodies as hydrogen, alkali metal (e.g., sodium, potassium, lithium),

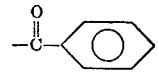

and the like, $R^2$ is ordinarily selected from instance from the group consisting of alkylene (e.g., methylene, ethylene, propylene, isopropylene, etc.), frequently having 1 to 18 carbon atoms, preferably 1 to 3 carbon atoms, alkylidene (e.g., ethylidene, propylidene, etc.), frequently having from 1 to 18 carbon atoms, preferably 1 to 3 carbon atoms, and cycloalkylene (e.g., cyclohexylene) or arylene (e.g., phenylene, naphthylene), usually having 6 to 12 carbon atoms, and $R^3$ and $R^4$ are the same or different and are ordinarily hydrogen or such radicals as alkyl having for example 1 to 18 carbon atoms, preferably 1 to 12 carbon atoms (e.g., methyl, ethyl, hexyl, dodecyl, etc.), or cycloalkyl having 5 to 8 carbon atoms (e.g., cyclopentyl, cyclooctyl, etc.);

(II) 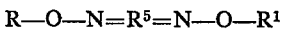

wherein R and $R^1$ can be for example as previously defined in Formula I, and $R^5$ is a tetravalent alicyclic radical having for example from 6 to 12 carbon atoms which may if desired be substituted, with halogen for example. Examples of the dioximes include 1,3 - dimethyl - 1,3 - dioximinopropane, 1,3 - dioximinopropane, 1,6 - dioximinohexane, 2,2 - dimethyl - 1,3 - dioximinopropane, 1,4-dioximinobutane, cyclohexane-1,4-dicarboxaldoxime, benzene-1,4-dicarboxaldoxime, dimethyl glyoxime, the quinone dioximes, notably the benzoquinone dioximes (o-, m-, and p-quinone dioxime) as well as the naphthoquinone dioximes (e.g., 2,6-naphthoquinone dioxime) the toluquinone dioximes (e.g., 2,4-toluquinone dioxime), the diphenoquinone dioximes (e.g. 2,4 - diphenoquinone dioxime), the diquinoyl dioximes, p-quinone dioxime diacetate, p-quinone dioxime dicaproate, p-quinone dioxime dinaphthenate, p-quinone dioxime succinate, p-quinone dioxime di(m-nitrobenzoate), p-quinone dioxime di(phenylacetate), monochloro-p-quinone dioxime, 2,3-dichloro-p-quinone dioxime and the like. Of particular importance are the benzoquinone and naphthoquinone dioximes, their metal salts and esters (e.g., the dibenzoate esters). Preferred are p-quinone dioxime ("GMF") and its dibenzoate ester ("Dibenzo GMF"). The dioxime is employed in amount effective to cure the EPDM elastomer. Usually the amount of dioxime employed for this purpose is from 1 part or less to 15 parts or more, preferably 3 to 10 parts, per 100 parts by weight of EPDM. If desired, more than one dioxime may be employed.

The N-haloamide is employed in amount effective to activate the dioxime cure or cross-linking of the EPDM elastomer in accordance with the invention. For this purpose the N-haloamide is frequently employed in amount of at least about 2 parts per 100 parts by weight of the EPDM, particularly when the N-haloamide is mixed into the EPDM composition, but smaller concentrations may also be effective, for example when the N-haloamide is introduced by diffusion (e.g., by application of a solution of the N-haloamide to the surface of a solid EPDM body containing the dioxime), as will be explained in more detail below. Larger amounts of N-haloamide (e.g. 10 parts or more per 100 of EPDM) may be used, a preferred amount usually being about 4 to 8 parts. If desired, more than one N-haloamide may be employed.

A wide variety of N-haloamides are useful in practicing the invention. There may be mentioned by way of non-limiting example such chemicals as those of one of the following Formulas III (the N-halomonoamide types), IV (the N-halohydantoins), V (the N-halosuccinimide types), VI (the N-haloglycolurils), and VII (trihaloisocyanuric acids):

(III)
$$R^6-\overset{O}{\overset{\|}{C}}-\overset{R^7}{\overset{|}{N}}-X$$

wherein $R^6$ is for example selected from the group consisting of such bodies as aliphatic radicals having from 1 to 18 carbon atoms, preferably 1 to 8 carbon atoms, (e.g., alkyl such as methyl, ethyl, hexyl, dodecyl, etc.) cycloaliphatic radicals having from 5 to 8 carbon atoms, preferably 6 carbon atoms (e.g., a cycloalkyl radical such as cyclohexyl), or aralkyl radicals having from 7 to 10 carbon atoms, $R^7$ is selected from such moieties as hydrogen (preferred), alkyl having from 1 to 10 carbon atoms (e.g., methyl, ethyl, decyl, etc.), cycloalkyl having for instance from 5 to 8 carbon atoms (e.g., cyclopentyl, cyclooctyl, etc.), and X is a halogen atom, frequently chlorine, bromine, or iodine;

(IV)
$$\begin{array}{c} R^8-C\overset{R^9}{\underset{|}{|}}----C=O \\ X^1-N\diagdown\quad\diagup N-X^2 \\ \overset{\|}{\underset{O}{C}} \end{array}$$

wherein $R^8$ and $R^9$ are the same or different and have for example the values previously assigned to $R^6$ in Formula III above, or may be joined together to form for example a closed ring structure of from 5 to 7 carbon atoms (cyclohexyl, cyclopentyl, cycloheptyl), and $X^1$ and $X^2$ are the same or different and are preferably both halogen although one of them may be hydrogen if the other is halogen;

(V)
$$\begin{array}{c} R^{10}-\overset{O}{\overset{\|}{C}}\diagdown \\ \qquad\qquad N-X \\ R^{11}-\underset{\|}{C}\diagup \\ \quad O \end{array}$$

where $R^{10}$ and $R^{11}$ are the same or different and have for example the values previously assigned to $R^6$ in Formula III above, or may be joined together to form an alkyl substituted or non-substituted aliphatic ring structure of, e.g., from 2 to 6 carbon atoms [for instance $R^{10}$ and $R^{11}$ may be alkylene of 1–4 carbon atoms (e.g. methylene) connected directly together or through a chain of 1 to 4 methylenes], or an alkyl substituted or non-substituted aromatic ring structure of, e.g., from 6 to 10 carbon atoms, and X is as previously defined in Formula III above;

(VI)
$$\begin{array}{c} \qquad X^3\;\;R^{12}\;\;X^4 \\ \qquad |\quad\;\;|\quad\;\;| \\ \qquad N----C----N \\ O=C\diagup\qquad\qquad\diagdown C=O \\ \qquad \diagdown\qquad\qquad\diagup \\ \qquad N----C----N \\ \qquad |\quad\;\;|\quad\;\;| \\ \qquad X^5\;\;R^{13}\;\;X^6 \end{array}$$

wherein $R^{12}$ and $R^{13}$ are the same or different and may have various values including hydrogen or those previously assigned to $R^6$ in Formula III above, and $X^3$, $X^4$, $X^5$ and $X^6$ are the same or different and are preferably all halogens, although they may also be hydrogen provided that at least one of them is halogen; and (VII)
$$\begin{array}{c} \qquad\quad X^7 \\ \qquad\quad | \\ \qquad\quad N \\ O=C\diagup\;\;\diagdown C=O \\ X^8-N\diagdown\;\;\diagup N-X^9 \\ \qquad\quad C \\ \qquad\quad \| \\ \qquad\quad O \end{array}$$

wherein $X^7$, $X^8$ and $X^9$ are the same or different halogen.

By way of illustrative specific examples of the N-haloamides there may be mentioned such compounds as:

N-chloroacetamide,
N-bromopropionamide,
N-iodovaleramide,
N-chlorocaproamide,
N-chloro-N-cyclohexylacetamide,
N-bromo-N-cyclopentylcaprylamide,
N-iodo-N-cyclohexylcapramide, also
N-chloro-cyclopentamide,
N-chlorocyclohexamide,
N-iodocyclooctamide,
N-chloro-2-decahydronaphthamide,
N-bromocyclohexacetamide,
N-chlorododecamide,
N-bromotetradecamide,
N-iodohexadecamide,
N-chlorostearamide,
N-bromostearamide,
N-chlorobenzamide,
5-methyl-N-chlorohydantoin,
5-ethyl-N-bromohydantoin,
5-isopropyl-N-iodohydantoin,
5-hexyl-N-bromohydantoin,
5-cyclohexyl-N-chlorohydantoin,
5,5-diisopropyl-N-bromohydantoin,
5-methyl-5-isobutyl-N-iodohydantoin,
5-methyl-N,N-dichlorohydantoin,
5-ethyl-N,N-dibromohydantoin,
5-propyl-N,N-diodohydantoin,
5-isopropyl-N,N-dichlorohydantoin,
5-butyl-N,N-dichlorohydantoin,
5-isobutyl-N,N-diiodohydantoin,
5-pentyl-N,N-diodohydantoin,
5-hexyl-N,N-dibromohydantoin,
5-octyl-N,N-diiodohydantoin,
5-decyl-N,N-diiodohydantoin,
5-dodecyl-N,N-dibromohydantoin,
5-hexadecyl-N,N-diiodohydantoin,
5-stearyl-N,N-dichlorohydantoin,
5,5-dimethyl-N,N-dichlorohydantoin,
5,5-diethyl-N,N-dibromohydantoin,
5,5-di-n-propyl-N,N-dichlorohydantoin,
5,5-diisopropyl-N,N-dichlorohydantoin,
5,5-dibutyl-N,N-dibromohydantoin,
5,5-dipentyl-N,N-diiodohydantoin, 5,5-dihexyl-N,N-dichlorohydantoin,
5,5-diheptyl-N,N-dibromohydantoin,
5,5-dioctyl-N,N-diiodohydantoin,
5,5-didecyl-N,N-dibromohydantoin,
5,5-dicyclopentyl-N,N-diiodohydantoin,
5,5-dicyclohexyl-N,N-dichlorohydantoin,
5,5-dicyclooctyl-N,N-diiodohydantoin,
5-methyl-5-ethyl-N,N-dichlorohydantoin,
5-methyl-5-isopropyl-N,N-dibromohydantoin,
5-methyl-5-isobutyl-N,N-dichlorohydantoin,
5-methyl-5-pentyl-N,N-diiodohydantoin,
5-ethyl-5-propyl-N,N-dichlorohydantoin,
5-ethyl-5-isopropyl-N,N-dichlorohydantoin,
5-ethyl-5-isoamyl-N,N-dibromohydantoin,
5-ethyl-5-isooctyl-N,N-diiodohydantoin,
5-propyl-5-butyl-N,N-dibromohydantoin,
5-isopropyl-5-isobutyl-N,N-diiodohydantoin, also
5-cyclopentyl-N,N-diiodohydantoin,
5-cyclohexyl-N,N-dichlorohydantoin,
5-cyclooctyl-N,N-dibromohydantoin,
5,5-dicyclohexyl-N,N-dibromohydantoin,
5-methyl-5-cyclohexyl-N,N-dichlorohydantoin,
5-ethyl-5-cyclohexyl-N,N-dibromohydantoin,
5-isopropyl-5-cyclohexyl-N,N-dichlorohydantoin,
5-octyl-5-cyclohexyl-N,N-diiodohydantoin, also
spiro[cyclohexane-1,5'-N,N-dichlorohydantoin],
N-acetyl-N-chloroacetamide,
N-acetyl-N-bromopropionamide,
N-propionyl-N-chloropropionamide,
N-bromosuccinamide,
N-chloroglutarimide,
N-bromoadipimide,
N-chlorophthalimide,
N-bromophthalimide,
1,3,4,6-tetrabromoglycoluril,
1,3,4,6-tetrachloro-3a-methylglycoluril,
1,6-dibromo-3a,6a-dimethylglycoluril,
1,3,4,6-tetrabromo-3a-ethylglycoluril,
1,6-diiodo-3a-methyl-6a-ethylglycoluril,
1,3,4,6-tetrachloro-3a,6a-diisopropylglycoluril,
1,3-dichloro-3a,6a-dibutylglycoluril,
1,3,4,6-tetrabromo-3a,6a-dipentylglycoluril,
1,3-diiodo-3a,6a-dihexylglycoluril,
1,3,4,6-tetrachloro-3a,6a-dioctylglycoluril,
1,3-diiodo-3a-decylglycoluril,
1,3,4,6-tetrabromo-3a,6a-didodecylglycoluril,
1,3-diiodo-3a-decylglycoluril,
1,3,4,6-tetrachloro-3a,6a-distearylglycoluril,
1,3,4,6-tetrachloro-3a-cyclopentylglycoluril,
1,4-dibromo-3a-cyclohexylglycoluril,
1,3,4,6-tetrachloro-3a,6a-dicyclohexylglycoluril,
1,3,4,6-tetrachloro-3a-methyl-6a-cyclohexylglycoluril,
1,3,4,6-tetrachloro-3a-stearyl-6a-cyclohexylglycoluril and others, tribromoisocyanuric acid, and the like.

The curable EPDM composition of the invention may if desired be purely a gum stock, containing only the dioxime curative and the N-haloamide. Alternatively, in addition to the dioxime curative and the N-haloamide activator the EPDM composition of the invention may contain other compounding ingredients such as one or more fillers (e.g., carbon black, silica, zinc oxide, etc.) The amount of filler may vary widely, for example from 0.5 to 150 parts per 100 parts by weight of the elastomer.

In one preferred practice of the invention the composition takes the form of a cement or adhesive comprising the described ingredients dissolved and/or dispersed in any suitable conventional inert volatile organic solvent or mixture of solvents, whether a hydrocarbon solvent or a non-hydrocarbon solvent, of aliphatic, cycloaliphatic or aromatic type such as pentane, hexane, heptane, octane, decane, dodecane, tetradecane, octadecane and the like, also, benzene, toluene, xylene, naphthalene, carbon tetrachloride, tetrachloroethylene, hexachloropropylene, mono- or dichlorobenzene, and the like.

Extender oils or other plasticizing or softening substances may also be present. The proportion of solids in the cement is not critical and frequently ranges from 20 to 40%, by weight. The cement may be applied to bodies (e.g., elastomers, wood, etc.) to be adhered together by any suitable conventional method, such as brushing, spraying, roller coating, knife spreading, etc. In practice the N-haloamide is preferably withheld from the cement until just prior to use. The cement may be painted, spread, or otherwise applied onto elastomeric bodies, such as sheets, molded objects, etc., prior to lamination. Upon curing of the cement the elastomeric bodies are found to be firmly adhered together. The elastomeric objects which are adhered with the aid of the cement of the invention may be either uncured or previously cured elastomer. The elastomer to be adhered by the cement may be EPDM as previously defined (an example of a suitable EPDM vulcanizate is disclosed in U.S. Pat. 3,330,790, Chambers, July 11, 1967, Example 1, Stock B cured 15 minutes at 320° F.), or other conventional rubber or elastomeric material, including the rubbery polymers of conjugated dienes, such as butadiene, isoprene, chlorobutadiene, etc., whether homopolymers as in polyisoprene (natural or synthetic), polybutadiene, polychloroprene and the like, or copolymers as in copolymers of such dienes with one or more copolymerizable monoethylenically unsaturated monomers (e.g., styrene, alpha-methylstyrene, acrylonitrile, methacrylonitrile, acrylic or methacrylic acids or esters thereof, isobutylene, vinylpyridine, etc.) as in butadiene-styrene copolymer, butadiene-acrylonitrile copolymer, isoprene-isobutylene copolymer, whether emulsion-prepared or solution-prepared, stereospecific or otherwise. As indicated, these elastomers may be adhered either in the cured (e.g., sulfur-cured, peroxide-cured, or otherwise cured) or uncured state, using the cement of the invention. Best results are usually obtained if the elastomeric surfaces to be adhered are first buffed or otherwise roughened, prior to application of the cement, particularly if the elastomer has previously been cured. Sheets of cured EPDM coated with the cement and lapped to form a seam become strongly adhered together upon cure of the cement. In this manner weather-resistant, waterproof covering may be produced on roofs and the like.

The cements or solutions may also be used as coatings or for making dipped goods or cast films or the like. Films cast from such cements onto a suitable release surface form cured vulcanizates in 1 to 6 hours at ambient temperatures (e.g., 72° F.). The physical properties of typical cast films made in this manner are given in Tables 1–7.

In another preferred embodiment of the invention the composition may take the form of a sealant or caulking composition, usually having a plastic or pasty consistency at room temperature. For this purpose various conventional softening and/or plasticizing substances may be incorporated in the composition to produce a solids content of e.g., 50–95%. Thus, caulks (e.g., solids of 85–95%) and sealants (e.g., solids of 50–65%) may be prepared by kneading EPDM elastomers with filler, oils, solvents and curatives until a knife-spreadable gum is produced. The caulk or sealant is introduced into a space or cavity to be caulked or sealed, whereupon curing for 2 to 4 days at ambient conditions produces tough vulcanizates. This form of the invention is particularly useful for such sealant or caulking applications as weatherproofing of buildings, windows, etc., expansion joints for pavements, filling seams of boats, etc.

An advantageous way of practicing the invention involves introducing the N-haloamide activator, to the EPDM elastomer containing the dioxime curative, by diffusion. According to this method of making a cured EPDM body, the EPDM elastomer is mixed with the dioxime curative in amount sufficient to cure the elastomer, the mixture is shaped in a desired shape, and the N-haloamide activator is applied to the surface of the elastomer. The activator diffuses into the elastomer and cure takes place. The N-haloamides having high solubility in the polymer matrix are most suitable for use in practicing this form of the invention. Thus, 1,3-dichloro-5-methyl-5-isobutyl hydantoin or 1,3 - dichloro - 5 - methyl-5-hexyl hydantoin for example, suitably in the form of a solution in a volatile organic solvent, may be painted onto the surface of the stock and allowed to diffuse into the stock to produce the desired cure at ambient temperature.

In a particularly preferred form of the invention, the composition includes silica filler. It has been found that the inclusion of silica filler in the composition greatly enhances adhesion, and makes it possible to obtain, between two cured EPDM bodies for example, an adhesive bond which is stronger than the EPDM bodies themselves. Thus, when the resulting laminate is pulled apart in an adhesion strength test, failure occurs in the EPDM body rather than in the adhesive layer. This is a truly remarkable new result. For this purpose the adhesive composition of EPDM, dioxime and N-haloamide may contain for example 0.5 part to 15 parts, preferably 3 to 10 parts, of silica, per 100 parts by weight of EPDM. While higher silica loadings than 15 parts may be used (e.g., 100 or 150 parts) while still obtaining excellent adhesion, there may be a reduction in the physical properties of the adhesive composition.

The curing system of the invention operates, as indicated, at ordinary ambient or room temperature. Out-doors in cold weather (e.g. −10° F.) the system is operative although a longer period of time will of course be required to reach the same level of cure as is obtained indoors or in warm weather. "Ambient temperature" as used herein includes such moderately elevated surface temperatures as may sometimes be encountered in working in sunlight for example (e.g., 110° F. or more). In general, the lower the concentration of curatives in the composition the longer the cure cycle required to achieve a given level of cure at a particular ambient temperature. At lower ambient temperatures higher levels of curatives may be desirable whereas at more elevated ambient temperatures lower concentrations of curatives may be used to achieve a satisfactory state of cure within a desired time.

1,3-dichloro-5-methyl-5-hexyl hydantoin may be prepared as follows: Chlorine gas is passed into a slurry of 40 gms. (0.2 mole) of 5-methyl-5-hexyl hydantoin (prepared from methyl hexyl ketone, sodium cyanide and ammonium carbonate), 32 gms. of sodium carbonate and 450 ml. of water at 40° C. until the pH is 7. A white oil precipitates which is separated and extracted with three times its volume of ethyl ether. The ether extract is washed three times with cold water, and then dried over anhydrous magnesium sulfate, and filtered. Evaporation of the ether produces a white semi-solid in 63% yield. The infrared spectrum of the product has bands corresponding to N-Cl structure.

The following examples, in which all quantities are expressed by weight unless otherwise indicated, will serve to illustrate the practice of the invention in more detail.

EXAMPLE I

Ambient Cure of Cast EPDM Film

The following masterbatch is prepared by milling the listed ingredients together:

Recipe MB–I

| Ingredients: | Parts |
|---|---|
| EPDM elastomer | 100 |
| Carbon black (HAF) | 50 |
| Carbon black (SRF) | 90 |
| Extender oil | 80 |
| Zinc oxide | 5 |
| p-Quinone dioxime (GMF) | 4.5 |
| | 329.5 |

The EPDM employed is an ethylene/propylene/5-ethylidene-2-norbornene terpolymer; E/P weight ratio 44/56; iodine number 10; Mooney viscosity 55 ML–4 at 212° F. The oil is a petroleum oil of naphthenic and paraffinic hydrocarbon type, viscosity 7788 SSU at 100° F., specific gravity 0.920 at 60° F., as represented by such commercially available materials as "Shellflex 881."

The foregoing masterbatch is dissolved to 25% solids in xylene to make a cement which is quite stable for long periods of time at room temperature. To portions of the masterbatch cement are added in a one-gallon Waring type blender various N-haloamide activators at levels indicated in Tables 1 through 7, while stirring rapidly, and agitation is continued for about 1 more minute. The thus-activated cements are then poured into metal molds, in which they are allowed to stand at room temperature (about 72° F.) for various lengths of time as indicated in Tables 1–7 during which the solvent evaporates and curing of the EPDM occurs. The physical properties of the cured films are then determined, with the results shown in Tables 1–7. The elongation set at break is determined by the ASTM D–412 procedure, measured 1 minute after rupture.

TABLE 1

[Cure of cast films activated with 1,3-dichloro-5-isobutyl hydantoin (mol. wt. 238; 29% Cl)]

| | Recipes | | |
|---|---|---|---|
| | 1 | 2 | 3 |
| MB-I (Example I masterbatch) | 329.5 | 329.5 | 329.5 |
| Activator | 1.0 | 1.9 | 5.7 |
| Xylene | 1,200 | 1,200 | 1,200 |
| | Properties | | |
| Cured 2 days at R.T.: | | | |
| S-100, p.s.i | 90 | 200 | 380 |
| S-200, p.s.i | 180 | 550 | 880 |
| S-300, p.s.i | 310 | | |
| Tensile, p.s.i | 490 | 950 | 1,180 |
| Elongation at break, percent | 460 | 270 | 290 |
| Elongation set at break, percent | 70 | 5 | 10 |
| Cured 7 days at R.T.: | | | |
| S-100, p.s.i | 100 | 240 | 440 |
| S-200, p.s.i | 210 | 580 | 920 |
| S-300, p.s.i | 340 | 880 | |
| Tensile, p.s.i | 420 | 1,140 | 1,320 |
| Elongation at break, percent | 380 | 420 | 258 |
| Elongation set at break, percent | 27 | 18 | 0 |

TABLE 2

[Cure of cast films activated with 1,3-dibromo-5,5-dimethyl hydantoin (mol. wt. 286; 56% Br)]

| | Recipes | | |
|---|---|---|---|
| | 1 | 2 | 3 |
| MB-I | 329.5 | 329.5 | 329.5 |
| Activator | 1.9 | 5.7 | 9.5 |
| Xylene | 1,200 | 1,200 | 1,200 |
| | Properties | | |
| Cured 2 days at R.T.: | | | |
| S-100, p.s.i | 100 | 190 | 230 |
| S-200, p.s.i | 170 | 520 | 460 |
| S-300, p.s.i | 280 | 890 | 730 |
| Tensile, p.s.i | 490 | 1,220 | 800 |
| Elongation at break, percent | 500 | 400 | 320 |
| Elongation set at break, percent | 60 | 25 | 10 |
| Cured 7 days at R.T.: | | | |
| S-100, p.s.i | 150 | 420 | 400 |
| S-200, p.s.i | 290 | 910 | 540 |
| S-300, p.s.i | 440 | 1,260 | 1,230 |
| Tensile, p.s.i | 550 | 1,370 | 1,230 |
| Elongation at break, percent | 370 | 340 | 300 |
| Elongation set at break, percent | 28 | 13 | 10 |

TABLE 3
[Cure of cast films activated with N-bromoacetamide (mol. wt. 138; 58.7% Br)]

| | Recipes | | |
|---|---|---|---|
| | 1 | 2 | 3 |
| MB-I | 329.5 | 329.5 | 329.5 |
| Activator | 1.9 | 5.7 | 9.5 |
| Xylene | 1,200 | 1,200 | 1,200 |
| | Properties | | |
| Cured 2 days at R.T.: | | | |
| S-100, p.s.i | 160 | 240 | 240 |
| S-200, p.s.i | 320 | 550 | 560 |
| S-300, p.s.i | 530 | 900 | 970 |
| Tensile, p.s.i | 960 | 1,250 | 1,150 |
| Elongation at break, percent | 550 | 450 | 370 |
| Elongation set at break, percent | 50 | 23 | 20 |
| Cured 7 days at R.T.: | | | |
| S-100, p.s.i | 220 | 430 | 460 |
| S-200, p.s.i | 470 | 980 | 1,050 |
| S-300, p.s.i | 650 | | |
| Tensile, p.s.i | 910 | 1,260 | 1,410 |
| Elongation at break, percent | 440 | 250 | 280 |
| Elongation set at break, percent | 25 | 10 | 10 |

TABLE 4
[Cure of cast films activated with N-bromosuccinimide (mol. wt. 178; 45% Br)]

| | Recipes | | |
|---|---|---|---|
| | 1 | 2 | 3 |
| MB-I | 329.5 | 329.5 | 329.5 |
| Activator | 1.9 | 5.7 | 9.5 |
| Xylene | 1,200 | 1,200 | 1,200 |
| | Properties | | |
| Cured 2 days at R.T.: | | | |
| S-100, p.s.i | 130 | 240 | 300 |
| S-200, p.s.i | 200 | 520 | 720 |
| S-300, p.s.i | 260 | 800 | 1,040 |
| Tensile, p.s.i | 480 | 1,040 | 1,220 |
| Elongation at break, percent | 610 | 410 | 330 |
| Elongation set at break, percent | 93 | 20 | 12 |
| Cured 7 days at R.T.: | | | |
| S-100, p.s.i | 180 | 280 | 470 |
| S-200, p.s.i | 310 | 850 | 980 |
| S-300, p.s.i | 530 | 1,180 | |
| Tensile, p.s.i | 670 | 1,220 | 1,240 |
| Elongation at break, percent | 380 | 310 | 240 |
| Elongation set at break, percent | 20 | 10 | 10 |

TABLE 5
[Cure of cast films activated with trichloroisocyanuric acid (mol. wt. 231; 45.4% Cl)]

| | Recipes | | |
|---|---|---|---|
| | 1 | 2 | 3 |
| MB-I | 329.5 | 329.5 | 329.5 |
| Activator | 1.9 | 5.7 | 9.5 |
| Xylene | 1,200 | 1,200 | 1,200 |
| | Properties | | |
| Cured 2 days at R.T.: | | | |
| S-100, p.s.i | 90 | 240 | 290 |
| S-200, p.s.i | 110 | 440 | 580 |
| S-300, p.s.i | 180 | 720 | 850 |
| Tensile, p.s.i | 200 | 1,120 | 1,250 |
| Elongation at break, percent | 400 | 520 | 520 |
| Elongation set at break, percent | 50 | 40 | 40 |
| Cured 7 days at R.T.: | | | |
| S-100, p.s.i | 90 | 320 | 400 |
| S-200, p.s.i | 180 | 750 | 730 |
| S-300, p.s.i | 270 | 1,060 | 1,040 |
| Tensile, p.s.i | 380 | 1,170 | 1,380 |
| Elongation at break, percent | 440 | 360 | 430 |
| Elongation set at break, percent | 40 | 20 | 25 |

TABLE 6
[Cure of cast films activated with 1,3-dichloro-5,5-dimethyl hydantoin (mol. wt. 197; 36.1% Cl)]

| | Recipes | | |
|---|---|---|---|
| | 1 | 2 | 3 |
| MB-I | 329.5 | 329.5 | 329.5 |
| Activator | 1.9 | 5.7 | 9.5 |
| Xylene | 1,200 | 1,200 | 1,200 |
| | Properties | | |
| Cured 2 days at R.T.: | | | |
| S-100, p.s.i | 170 | 250 | 320 |
| S-200, p.s.i | 420 | 630 | 680 |
| S-300, p.s.i | 670 | 1,010 | 1,120 |
| Tensile, p.s.i | 1,180 | 1,520 | 1,640 |
| Elongation at break, percent | 540 | 480 | 420 |
| Elongation set at break, percent | 33 | 23 | 25 |
| Cured 7 days at R.T.: | | | |
| S-100, p.s.i | 290 | 380 | 470 |
| S-100, p.s.i | 590 | 940 | 980 |
| S-300, p.s.i | 840 | 1,320 | 1,420 |
| Tensile, p.s.i | 1,090 | 1,410 | 1,530 |
| Elongation at break, percent | 400 | 310 | 310 |
| Elongation at set break, percent | 20 | 12 | 12 |

TABLE 7
[Cure of cast films activated with tetrachloroglycoluril (mol. wt. 280; 50.6% Cl)]

| | Recipes | | |
|---|---|---|---|
| | 1 | 2 | 3 |
| MB-I | 329.5 | 329.5 | 329.5 |
| Activator | 1.9 | 5.7 | 9.5 |
| Xylene | 1,200 | 1,200 | 1,200 |
| Cured 2 days at R.T.: | Properties | | |
| S-100, p.s.i | 230 | 350 | 290 |
| S-200, p.s.i | 500 | 800 | 620 |
| S-300, p.s.i | 800 | 1,250 | 950 |
| Tensile, p.s.i | 1,410 | 1,670 | 1,160 |
| Elongation at break, percent | 540 | 390 | 360 |
| Elongation set at break, percent | 30 | 20 | 20 |
| Cured 7 days at R.T.: | | | |
| S-100, p.s.i | 380 | 580 | 400 |
| S-200, p.s.i | 760 | 1,200 | 880 |
| S-300, p.s.i | 1,070 | 1,750 | |
| Tensile, p.s.i | 1,450 | 1,890 | 1,080 |
| Elongation at break, percent | 410 | 330 | 250 |
| Elongation set at break, percent | 15 | 18 | 8 |

EXAMPLE II

EPDM Caulk or Sealant

A series of knife-spreadable gums are prepared, according to the following recipe, using the various N-haloamide activators shown in Table 8, by kneading the ingredients together:

Recipe

| Ingredients: | Parts |
|---|---|
| EPDM elastomer | 100 |
| HAF black | 50 |
| SRF black | 90 |
| Oil | 120 |
| Zinc oxide | 5 |
| GMF (p-quinone dioxime) | 4.5 |
| N-haloamide activator | 10 |
| Xylene | 15 |

The EPDM and the oil are the same as in Example I. The resulting thick pastes are pressed to .160 inch films by a cold press and allowed to stand at room temperature (about 72° F.). The hardness is measured for 3 consecutive days, and other physical properties are determined after 4 days, with the results shown in Table 8.

TABLE 8.—AMBIENT CURE OF EPDM CAULKING AND SEALANT COMPOSITION

| Test | 1 | 2 | 3 | 4 | 5 |
|---|---|---|---|---|---|
| N-haloamide activator, amount added, parts PHR: | | | | | |
| Trichloroisocyanuric acid | 10 | | | | |
| 1,3-dichloro-5,5-dimethyl hydantoin | | 10 | | | |
| 1,3-dichloro-5-methyl-5-isobutyl hydantoin | | | 10 | | |
| Tetrachloroglycoluril | | | | 10 | |
| Hardness of film, Shore A, cure time (at R.T.): | | | | | |
| 24 hours | 20 | 15 | 20 | 25 | 15 |
| 48 hours | 20 | 30 | 35 | 40 | 15 |
| 72 hours | 30 | 35 | 40 | 45 | 15 |
| (Physical properties after 96 hours (at R.T.): | | | | | |
| S-100, p.s.i | (¹) | 130 | 100 | 100 | (²) |
| S-200, p.s.i | (¹) | 280 | 270 | 220 | (²) |
| S-300, p.s.i | (¹) | 480 | 460 | 380 | (²) |
| Tensile, p.s.i | (¹) | 630 | 630 | 460 | (²) |
| Elongation at break, percent | (¹) | 400 | 400 | 350 | (²) |

¹ Not tested.   ² Too soft to test.

The data in Table 8 indicate a steady increase in the hardness of the curing stock containing an N-haloamide activator depending on time (samples 1-4) whereas no change was measured with the material (sample 5) not containing an N-haloamide. After 4 days at room temperature, cured samples 2 through 4 showed a remarkable increase in modulus (S-100 etc.), and ultimate tensile strength at satisfactory elongation values in comparison to the control stock 5.

EXAMPLE III

Surface Penetration of N-Haloamide Activator and Concomitant Ambient Cure

A four by four inch sheet, .030 inch thick, of a masterbatch, similar to MB-I in Example I, is painted with a 10% solution of 1,3-dichloro-5-methyl-5-isobutyl hydantoin in tetrachloroethylene and allowed to stand at room temperature for several days. Daily examination indicates that the surface is hardening and that cure is progressing further and further into the sheet. After 10 days it appears that the activator (N-haloamide) has migrated at least .015 inch (50% of the sheet thickness) into the sheet and it is most difficult to tear the specimen. An untreated control is readily ripped and pulled apart.

EXAMPLE IV

Adhesion of Cured EPDM Stock With Adhesive Cements

This example demonstrates the effectiveness of the cements of the invention in adhering previously cured EPDM stock.

To portions of a 25% solution of xylene of the masterbatch of Example I (MB-I) are added 5.7 parts (per hundred parts of rubber) of the N-haloamides indicated in Table 9, according to the procedure used in Example I. The pot life of these cements is sufficiently long to allow the cement to be painted onto surfaces to be adhered. To test the cement, it is painted onto the surfaces of conventional sulfur-cured sheets of EPDM which are then overlapped 1" and the cement is allowed to cure at room temperature (about 72° F.) for 2 days. The strength of the adhesive bond is then determined by pulling the sheets apart in an Instron tensile testing machine at a speed of 12 inches per minute. The results are noted in Table 9, which includes, for comparison, a control from which the N-haloamide is omitted. It will be seen that the 28 pound strength obtained with trichloroisocyanuric acid (Test 1) and the 24.5 pound strength with tetrachloroglycoluril (Test 2) are greatly in excess of the 8–10 pounds obtained when the N-haloamide is omitted (Test 3).

TABLE 9.—ADHESION OF LAPPED EPDM SHEET, CEMENT FORMULATION

| Test | 1 | 2 | 3 |
|---|---|---|---|
| Ingredients, parts: | | | |
| Masterbatch MB-I | 329.5 | 329.5 | 329.5 |
| Xylene | 1,200 | 1,200 | 1,200 |
| Trichloroisocyanuric acid | 5.7 | | |
| Tetrachloroglycoluril | | 5.7 | |
| Adhesive strength (Instron pull at 12"/min., R.T.), pounds per sq. inch overlap | 28.0 | 24.5 | 8–10 |

EXAMPLE V

Improvement in Adhesion Brought About by Silica

The following example demonstrates that the adhesion of cured rubber stock may be greatly enhanced by the incorporation of silica in the adhesive cement. To an EPDM-type elastomer (containing, by weight, 57% ethylene, 38% propylene and 5% 5-ethylidene-2-norbornene) having a Mooney viscosity (ML-4) of 55 at 212° F., are added the ingredients listed in Table 10 to make three different test cements.

TABLE 10.—EPDM ADHESIVE CONTAINING SILICA

| Test | 1 | 2 | 3 |
|---|---|---|---|
| Ingredients: | | | |
| EPDM elastomer | 100 | 100 | 100 |
| FEF carbon black | 40 | 40 | 40 |
| Silica | 5 | 10 | 15 |
| Zinc oxide | 3 | 3 | 3 |
| Stearic acid | 1 | 1 | 1 |
| GMF | 4.5 | 4.5 | 4.5 |
| 1,3-dichloro-5,5-dimethyl hydantoin | 1.5 | 1.5 | 1.5 |
| Xylene | 630 | 640 | 650 |
| Adhesive strength (Instron pull at 12"/min., R.T.), lbs. per sq. in. overlap: | | | |
| Unbuffed surface | 17.5 | 21 | 19 |
| Buffed surface | ¹35 | ¹40 | ¹39 |

¹ Cured sheet torn before adhesive bond failure.

The silica employed is a precipitated hydrated amorphous silica, such as the commercially available material known as "Silene D." The cements are used to adhere together two overlapped sheets of cured EPDM. In one case, the surfaces of the EPDM sheets are left unbuffed, while in another case the surfaces to be adhered are buffed prior to application of the cement. The cemented assemblies are allowed to cure for 48 hours at room temperature (about 72° F.) before testing the adhesive strength in the Instron tester as described in Example IV, with the results shown in Table 10. It is especially remarkable that the adhesion test piece made with buffed surfaces failed in the rubber stock rather than in the adhesive. The adhesion values obtained are improved at least 50% over the values obtained with otherwise similar cement containing no silica (unbuffed surface, about 12 pounds; buffed surface about 22 pounds).

EXAMPLE VI

This example demonstrates the vast difference in the action of the present curing system on EPDM as compared to the action of the same curing system in butyl rubber. The following masterbatches VI-A and VI-B are prepared:

RECIPE

| Ingredients, parts: | VI-A | VI-B |
|---|---|---|
| Butyl rubber | 100 | |
| EPDM | | 100 |
| HAF black | 40 | 40 |
| Zinc oxide | 5 | 5 |
| Stearic acid | 1 | 1 |
| GMF | 4.5 | 4.5 |

The butyl rubber employed has an iodine number of 11.4, Mooney viscosity 75 ML-4 at 212° F. The EPDM contains 54.4% ethylene, 41.3% propylene and 4.3% 5-ethylidene-2-norbornene, by weight; iodine number 10.1; Mooney viscosity 78 ML-4 at 212° F.

The masterbatches are dissolved separately in xylene at a solution concentration of 25% solids, and the resulting cements are activated with the H-haloamide, 5,5-dimethyl-1,3-dichlorohydantoin as follows:

| Recipe | VI-A | VI-B |
|---|---|---|
| Cement, g | 150 | 150 |
| 5,5-dimethyl-1,3-dichlorohydantoin, g | 0.15 | 0.15 |
| Xylene, ml | 30 | 20 |

Viscosity measurements are taken on the cement to follow the process of the cure at room temperature (about 72° F.) employing a Brookfield type viscometer, with the following results:

| Time, hours | Viscosity, centipoises | |
|---|---|---|
| | VI-A | VI-B |
| 0 | 1,400 | 900 |
| 0.25 | 1,600 | 1,100 |
| 0.50 | 1,700 | 1,400 |
| 0.75 | 1,750 | 1,700 |
| 1.00 | 1,750 | Gelled |
| 2.00 | 1,850 | |
| 6.00 | 3,400 | |
| 10.00 | 8,500 | |
| 20.00 | 28,000 | |
| 24.00 | 188,000 | |
| 50.00 | Gelled | |

The data show that although the Mooney viscosities and levels of unsaturation of the two elastomers are about the same, the curing system, unexpectedly, is much more effective in the EPDM than in the butyl rubber.

Having thus described my invention what I claim and desire to protect by Letters Patent is:

1. A composition comprising an ethylene-propylene-nonconjugated diene elastomer, a dioxime in amount effective to cure said elastomer and a N-haloamide in amount effective to activate the said cure, the said dioxime being selected from the group consisting of dioxime curatives of the following Formulas I and II:

(I)
$$R-O-N=\overset{R^3}{\underset{|}{C}}-R^2-\overset{R^4}{\underset{|}{C}}=N-O-R^1$$

wherein R and $R^1$ are the same or different and are selected from the group consisting of hydrogen, sodium, potassium, lithium and

$R^2$ is selected from the group consisting of alkylene having 1 to 3 carbon atoms, alkylidene having 1 to 3 carbon atoms, cycloalkylene having from 6 to 12 carbon atoms and arylene having 6 to 12 carbon atoms, and $R^3$ and $R^4$ are the same or different and are selected from the group consisting of hydrogen, alkyl having 1 to 12 carbon atoms and cycloalkyl having 5 to 8 carbon atoms;

(II)         $R-O-N=R^5=N-O-R^1$ wherein R and $R^1$ are as previously defined for Formula I, and $R^5$ is a tetravalent alicyclic radical having 6 to 12 carbon atoms, and the said N-haloamide is an activator selected from the group consisting of N-halomonoamides of Formula III, N-halohydantoins of Formula IV, N-halosuccinimide types of Formula V, N-haloglycolurils of Formula VI and trihalocyanuric acids of Formula VIII, as follows:

(III)
$$R^6-\overset{O}{\underset{\|}{C}}-\overset{R^7}{\underset{|}{N}}-X$$

wherein $R^6$ is selected from the group consisting of alkyl having 1 to 8 carbon atoms and cycloalkyl having 5 to 8 carbon atoms, $R^7$ is selected from the group consisting of hydrogen, alkyl having 1 to 10 carbon atoms, aralkyl having 7 to 10 carbon atoms and cycloalkyl having 5 to 8 carbon atoms, and X is selected from the group consisting of chlorine, bromine and iodine;

(IV)
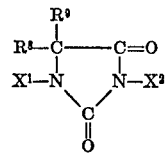

wherein $R^8$ and $R^9$ are the same or different and are as previously defined for $R^6$ in Formula III, and $X^1$ and $X^2$ are the same or different and are selected from the group consisting of hydrogen and halogen provided that at least one of them is halogen, said halogen being selected from the group consisting of chlorine, bromine and iodine;

(V)
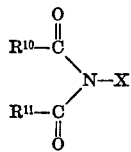

wherein $R^{10}$ and $R^{11}$ are the same or different and are as previously defined for $R^6$ in Formula III, or may be alkylene having 1 to 4 carbon atoms joined directly together or through a chain of up to 4 methylene groups, and X is as previously defined for Formula III;

(VI)
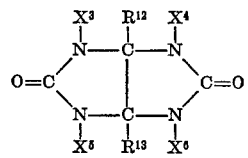

wherein $R^{12}$ and $R^{13}$ are the same or different and are hydrogen or as previously defined for $R^6$ in Formula III, and $X^3$, $X^4$, $X^5$ and $X^6$ are the same or different and are selected from the group consisting of hydrogen and halogen provided that at least one of them is halogen, said halogen being selected from the group consisting of chlorine, bromine and iodine; and (VII)
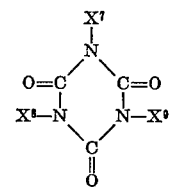

wherein $X^7$, $X^8$ and $X^9$ are the same or different and are halogen selected from the group consisting of chlorine, bromine and iodine.

2. A composition as in claim 1 further containing silica filler.

3. A composition as in claim 1 in which the dioxime is selected from the group consisting of p-quinone dioxime and p-quinone dioxime dibenzoate.

4. A cement comprising the composition of claim 1 dissolved in a volatile organic solvent.

5. A method of curing an ethylene-propylene-nonconjugated diene elastomer comprising subjecting to ambient temperature the composition of claim 1.

6. A composition as in claim 1 in which the said nonconjugated diene is 5-ethylidene-2-norbornene.

7. A composition as in claim 1 in which the said dioxime curative has the said Formula II.

8. A composition as in claim 1 in which the said dioxime is p-quinone dioxime.

9. A composition as in claim 1 in which the said N-haloamide activator has the said Formula III.

10. A composition as in claim 1 in which the said N-haloamide activator has the said Formula IV.

11. A composition as in claim 1 in which the said N-haloamide activator has the said Formula V.

12. A composition as in claim 1 in which the said N-haloamide activator has the said Formula VI.

13. A composition as in claim 1 in which the said N-haloamide activator has the said Formula VII.

14. A composition as in claim 1 in which the said N-haloamide activator has the said Formula VIII.

15. A composition as in claim 1 in which the said N-haloamide activator is 1,3 - dibromo-5,5-dimethylhydantoin.

16. A composition as in claim 1 in which the said N-haloamide activator is N-bromosuccinimide.

17. A composition as in claim 1 in which the said N-haloamide activator is N-bromoacetamide.

18. A composition as in claim 1 in which the said N-haloamide activator is trichloroisocyanuric acid.

19. A composition as in claim 1 in which the said N-haloamide activator is tetrachloroglycoluril.

20. A composition as in claim 1 in which the said N-haloamide activator is 1,3 - dichloro-5,5-dimethylhydantoin.

21. A composition as in claim 1 in which the said N-haloamide activator is 1,3-dichloro-5-methyl-5-isobutylhydantoin.

22. A composition as in claim 1 in which the said N-haloamide activator is 1,3 - dichloro-5-methyl-5-hexylhydantoin.

23. A composition as in claim 1 in which the said mixture contains zinc oxide.

24. A method of making a cured ethylene-propylene-nonconjugated diene elastomer body having the composition recited in claim 1 comprising mixing ethylene-propylene-nonconjugated diene elastomer with the said dioxime in amount sufficient to cure the elastomer, shaping the mixture in a desired shape, and applying to the surface of the elastomer the said N-haloamide activator for the cure which is soluble in the said elastomer, whereby the said activator diffuses into the elastomer and cure of the elastomer takes place.

25. A method as in claim 24 in which the said activator is applied in the form of a solution in a volatile organic solvent.

26. A method of curing an ethylene-propylene-nonconjugated diene terpolymer elastomer comprising preparing a curable mixture by bringing together 100 parts by weight of said elastomer with from 3 to 10 parts by weight of a dioxime as a curing agent for said elastomer and 4 to 8 parts by weight of a N-haloamide as an activator for said curing agent, the said curing agent being selected from the group consisting of dioximes of the following Formulas I and II:

(I) $$R-O-N=C(R^3)-R_2-C(R^4)=N-O-R^1$$

wherein R and $R^1$ are the same or different and are selected from the group consisting of hydrogen, sodium, potassium, lithium and $$-\overset{O}{\underset{\|}{C}}-\text{C}_6\text{H}_5$$

$R^2$ is selected from the group consisting of alkylene having 1 to 3 carbon atoms, alkylidene having 1 to 3 carbon atoms, cycloalkylene having from 6 to 12 carbon atoms and arylene having 6 to 12 carbon atoms, and $R^3$ and $R^4$ are the same or different and are selected from the group consisting of hydrogen, alkyl having 1 to 12 carbon atoms and cycloalkyl having 5 to 8 carbon atoms;

(II) $$R-O-N=R^5=O-R^1$$

wherein R and $R^1$ are as previously defined for Formula I, and $R^5$ is a tetravalent alicyclic radical having 6 to 12 carbon atoms, and the said activator is a N-haloamide selected from the group consisting of N-halomonoamides of Formula III, N-halohydantoins of Formula IV, N-halosuccinimide types of Formula V, N-haloglycolurils of Formula VI and trihalocyanuric acids of Formula VII, as follows:

(III)
$$R^6-\overset{O}{\underset{\|}{C}}-\overset{R^7}{\underset{|}{N}}-X$$

wherein $R^6$ is selected from the group consisting of alkyl having 1 to 8 carbon atoms and cycloalkyl having 5 to 8 carbon atoms, $R^7$ is selected from the group consisting of hydrogen, alkyl having 1 to 10 carbon atoms, aralkyl having 7 to 10 carbon atoms and cycloalkyl having 5 to 8 carbon atoms, and X is selected from the group consisting of chlorine, bromine and iodine;

(IV)
$$\begin{array}{c} R^9 \\ | \\ R^8-C-----C=O \\ | \hspace{1cm} | \\ X^1-N \hspace{0.5cm} N-X^2 \\ \backslash \hspace{0.3cm} / \\ C \\ \| \\ O \end{array}$$

wherein $R^8$ and $R^9$ are the same or different and are as previously defined for $R^6$ in Formula III, and $X^1$ and $X^2$ are the same or different and are selected from the group consisting of hydrogen and halogen provided that at least one of them is halogen, said halogen being selected from the group consisting of chlorine, bromine and iodine;

(V)
$$\begin{array}{c} O \\ \| \\ R^{10}-C \\ \hspace{1cm} \backslash \\ \hspace{1.5cm} N-X \\ \hspace{1cm} / \\ R^{11}-C \\ \| \\ O \end{array}$$

wherein $R^{10}$ and $R^{11}$ are the same or different and are as previously defined for $R^6$ in Formula III, or may be alkylene having 1 to 4 carbon atoms joined directly together or through a chain of up to 4 methylene groups, and X is as previously defined for Formula III;

(VI)
$$\begin{array}{c} X^3 \hspace{0.5cm} R^{12} \hspace{0.5cm} X^4 \\ | \hspace{0.3cm} | \hspace{0.3cm} | \\ N---C---N \\ / \hspace{1.5cm} \backslash \\ O=C \hspace{1.5cm} C=O \\ \backslash \hspace{1.5cm} / \\ N---C---N \\ | \hspace{0.3cm} | \hspace{0.3cm} | \\ X^5 \hspace{0.5cm} R^{13} \hspace{0.5cm} X^6 \end{array}$$

wherein $R^{12}$ and $R^{13}$ are the same or different and are hydrogen or as previously defined for $R^6$ in Formula III, and $X^3$, $X^4$, $X^5$ and $X^6$ are the same or different and are selected from the group consisting of hydrogen and halogen provided that at least one of them is halogen, said halogen being selected from the group consisting of chlorine, bromine and iodine; and (VII)
$$\begin{array}{c} X^7 \\ | \\ N \\ / \hspace{0.5cm} \backslash \\ O=C \hspace{0.5cm} C=O \\ | \hspace{1cm} | \\ X^8-N \hspace{0.5cm} N-X^9 \\ \backslash \hspace{0.3cm} / \\ C \\ \| \\ O \end{array}$$

wherein $X^7$, $X^8$ and $X^9$ are the same or different and are halogen selected from the group consisting of chlorine, bromine and iodine, and thereafter subjecting the resulting curable mixture to a temperature of from −10° F. to 110° F. to bring about cure thereof, the said curable mixture being prepared by applying the said N-haloamide activator to the surface of the said elastomer containing the said dioxime curative, whereby the said activator diffuses into the said elastomer.

27. A method as in claim 26 in which the said N-haloamide activator is 1,3-dichloro-5-methyl-5-isobutylhydantoin or 1,3-dichloro-5-methyl-5-hexylhydantoin, applied in the form of a solution in a volatile organic solvent.

References Cited

UNITED STATES PATENTS

| | | | |
|---|---|---|---|
| 3,478,004 | 11/1969 | Kehr et al. | 260—80.78 |
| 3,261,888 | 7/1966 | Cornell et al. | 260—80.78 X |
| 2,442,083 | 5/1948 | Hall et al. | 161—243 |
| 2,170,191 | 8/1939 | Fischer | 260—796 |
| 3,408,320 | 10/1968 | Brucksch | 260—41.5 AQ |
| 3,398,111 | 8/1968 | Willis | 260—33.6 AQ |

LEWIS T. JACOBS, Primary Examiner

U.S. Cl. X.R.

260—80.78

PO-1050
(5/69)

UNITED STATES PATENT OFFICE
CERTIFICATE OF CORRECTION

Patent No. 3,804,798　　　　　　　　Dated April 16, 1974

Inventor(s) Stephen E. Cantor

It is certified that error appears in the above-identified patent and that said Letters Patent are hereby corrected as shown below:

Column 15, line 70, the portion of the formula reading $=R^5=O-$ should read $=R^5=N-O-$ Signed and sealed this 8th day of October 1974.

(SEAL)
Attest:

McCOY M. GIBSON JR.
Attesting Officer

C. MARSHALL DANN
Commissioner of Patents